US011956454B2

(12) United States Patent
Wang

(10) Patent No.: US 11,956,454 B2
(45) Date of Patent: Apr. 9, 2024

(54) DECODED PICTURE BUFFER MANAGEMENT AND SUBPICTURES IN VIDEO CODING

(71) Applicant: Bytedance Inc., Los Angeles, CA (US)

(72) Inventor: Ye-Kui Wang, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 18/083,908

(22) Filed: Dec. 19, 2022

(65) Prior Publication Data

US 2023/0119084 A1 Apr. 20, 2023

Related U.S. Application Data

(63) Continuation of application No. PCT/US2021/037371, filed on Jun. 15, 2021.

(60) Provisional application No. 63/040,427, filed on Jun. 17, 2020.

(51) Int. Cl.
*H04N 19/423* (2014.01)
*H04N 19/169* (2014.01)
*H04N 19/70* (2014.01)

(52) U.S. Cl.
CPC ......... *H04N 19/423* (2014.11); *H04N 19/188* (2014.11); *H04N 19/70* (2014.11)

(58) Field of Classification Search
CPC .... H04N 19/188; H04N 19/423; H04N 19/70; H04N 21/234327; H04N 21/234345; H04N 21/440245; H04N 21/8451
See application file for complete search history.

(56) References Cited

U.S. PATENT DOCUMENTS

| | | |
|---|---|---|
| 2015/0381998 A1 | 12/2015 | Wang et al. |
| 2019/0007692 A1 | 1/2019 | Deshpande |
| 2019/0342581 A1* | 11/2019 | Deshpande ............ H04N 19/70 |
| 2020/0351497 A1* | 11/2020 | Skupin ................. H04N 19/119 |
| 2021/0235123 A1 | 7/2021 | Choi et al. |
| 2022/0239949 A1* | 7/2022 | Hannuksela ......... H04N 19/105 |

FOREIGN PATENT DOCUMENTS

| | | | |
|---|---|---|---|
| WO | 2019145262 A1 | 8/2019 | |
| WO | WO-2019145262 A1 * | 8/2019 | ........... H04L 65/601 |
| WO | 2021123159 A1 | 6/2021 | |

OTHER PUBLICATIONS

Boyce, Jill & Ramasubramanian, Adarsh & Skupin, Robert & Sullivan, Gary & Tourapis, Alexis & Wang, Ye-Kui. (2018). JCTVC-AC1005: HEVC Additional Supplemental Enhancement Information (Draft 4) (Year: 2018).*

(Continued)

*Primary Examiner* — Maria E Vazquez Colon
(74) *Attorney, Agent, or Firm* — Conley Rose, P.C.

(57) ABSTRACT

Embodiments for video encoding and video decoding are described. One example method includes performing a conversion between a video and a bitstream of the video, wherein the bitstream includes one or more pictures including one or more subpictures according to a rule, and wherein the rule specifies that, responsive to a condition, a rewriting operation is performed on referenced one or more sequence parameter sets during a subpicture sub-bitstream extraction process by which a target output sub-bitstream is extracted from the bitstream.

12 Claims, 15 Drawing Sheets

(56) References Cited

OTHER PUBLICATIONS

Skupin, "Motion-Constrained Tile Sets Extraction Information SEI Messages Draft 1," JCTVC-Y1008, Oct. 2016, Chengdu, CN (Year: 2016).*

R. Skupin, "Motion-Constrained Tile Sets Extraction Information SEI Messages Draft 1", JGTVC-Y1008, Joint Collaborative Team on Video Coding (JGT-VC) of ITU-T SG 16 WP 3 and ISO/IEC JTC 1/SC 29/KG 11 25th Meeting: Chengdu, CN, Oct. 14-21, 2016 (Year: 2016).*

Document: JVET-S0233, Xiu, X., et al., "Suggested bug fixes for ACT text in VVC draft 9," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.

Document: JVET-S0241-r1, Hendry, "AHG9: On signalling of POC MSB information in picture header," Joint Video Experts Team (JVET) of ITUu-T SG 16 WP 3 and ISO/IEC JTC 1/SC 29/WG 11 19th Meeting: by teleconference, Jun. 22- Jul. 1, 2020, 3 pages.

"Series H: Audiovisual and Multimedia Systems Infrastructure of audiovisual services—Coding of moving video High efficiency video coding," Rec. ITU-T H.265 | ISO/IEC 23008-2 (in force edition), Nov. 2019, 712 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

Document: JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

Document: JVET-Q2002-v3, Chen, J., et al., "Algorithm description for Versatile Video Coding and Test Model 8 (VTM 8)," Joint Video Experts Team (JVET) of ITU-T SF 16 WP 3 and ISO/IEC JTC 1/SC 29/WG 11 17th Meeting: Brussels, BE, Jan. 7-17, 2020, 97 pages.

Bossen, F., VTM software, Retrieved from the Internet: https://vcgit.hhi.fraunhofer.de/jvet/VVCSoftware_VTM.git, Oct. 18, 2022, 3 pages.

Document: JVET-S0099, Skupin, R., et al., "AHG12: SEI message handling in subpicture extraction," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.

Foreign Communication From A Related Counterpart Application, PCT Application No. PCT/US2021/037371, International Search Report dated Sep. 16, 2021, 16 pages.

\* cited by examiner

700

702

Performing a conversion between a video comprising one or more video layers comprising one or more color components and a coded representation of the video; wherein the coded representation conforms to a format rule that specifies that the coded representation includes a single syntax structure applicable to each layer of a multi-layer output layer set of the coded representation indicative of decoded picture buffer parameters

FIG. 7

DECODED PICTURE BUFFER MANAGEMENT AND SUBPICTURES IN VIDEO CODING

CROSS-REFERENCE TO RELATED APPLICATIONS

This application is a continuation of International Application No. PCT/US2021/037371 filed on Jun. 15, 2021, which claims the priority to and benefits of U.S. Provisional Patent Application No. 63/040,427 filed on Jun. 17, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing a coded representation of a video or an image.

In one example aspect, a video processing method is disclosed. The method includes performing a conversion between a video and a bitstream of the video, wherein the bitstream comprises one or more pictures comprising one or more subpictures according to a rule, and wherein the rule specifies that, responsive to a condition, a rewriting operation is performed on referenced one or more sequence parameter sets during a subpicture sub-bitstream extraction process by which a target output sub-bitstream is extracted from the bitstream.

In another example aspect, a video processing method is disclosed. The method includes performing a conversion between a video comprising one or more pictures and a bitstream of the video, wherein the bitstream includes one or more output layer sets comprising multiple layers according to a format rule, wherein the format rule specifies to indicate in the bitstream a single syntax structure applicable to each of the one or more output layer sets, and wherein the single syntax structure includes decoded picture buffer parameters.

In another example aspect, a video processing method is disclosed. The method includes performing a conversion between a video and a bitstream of the video, wherein the bitstream comprises one or more pictures comprising one or more subpictures according to a rule, and wherein the rule specifies that, during a subpicture sub-bitstream extraction process in which a target output sub-bitstream is extracted from the bitstream, in response to removal of a subpicture from the bitstream, all supplemental enhancement information network abstraction layer units that include a non-scalable-nested supplemental enhancement information message of a particular payload type are also removed.

In another example aspect, a video processing method is disclosed. The method includes performing a conversion between a video and a bitstream of the video according to a rule, wherein the bitstream comprises multiple access units comprising one or more pictures, and wherein the rule specifies that a current picture of a current access unit is removed from a decoded picture buffer in response to: (1) the current picture not being a first picture of the current access unit, and (2) the current access unit being a first access unit in the bitstream a decoding order.

In another example aspect, a video processing method is disclosed. The method includes performing a conversion between a video comprising one or more pictures and a bitstream of the video, wherein the bitstream includes a first syntax element with a value which indicates a presence of a second syntax element in a picture header specifying a value of a picture order count most significant bit cycle of a current picture, wherein the bitstream conforms to a format rule that species that the value of the first syntax element is equal to 1 in response to: (1) the current picture associated with the picture header is an intra random access point picture or a gradual decoding refresh picture with an associated third syntax element equal to 0 indicating that the current picture is a recovery point picture, (2) a picture order count difference between the current picture and a previous intra random access point picture or a previous gradual decoding refresh picture with the associated third syntax element equal to 0 in a same layer in a decoding order is equal to or greater than a variable that indicates a maximum picture order count least significant bit divided by 2, and (3) a value of NumSubLayersInLayerInOLS[i][GeneralLayerIdx[nuh_layer_id]] is equal to 0 for any value of i in a range 0 TotalNumOlss−1, inclusive, and vps_independent_layer_flag[GeneralLayerIdx[nuh_layer_id]] is equal to 1, wherein NumSubLayersInLayerInOLS[i][GeneralLayerIdx[nuh_layer_id]] indicates a number of sublayers in the GeneralLayerIdx[nuh_layer_id]-th output layer in an i-th output layer set, wherein TotalNumOlss specifies a total number of output layer sets specified by a video parameter set, wherein vps_independent_layer_flag[GeneralLayerIdx[nuh_layer_id]] equal to 1 specifies that a layer with a layer index equal to GeneralLayerIdx[nuh_layer_id] does not use inter-layer prediction, wherein GeneralLayerIdx[nuh_layer_id] specifies a layer index of a layer identifier equal to nuh_layer_id, and wherein nuh_layer_id specifies an identifier of a layer to which a video coding layer network abstraction layer unit belongs or the identifier of a layer to which a non-video coding layer network abstraction layer unit applies.

In another example aspect, a video processing method is disclosed. The method includes performing a conversion between a video comprising one or more video layers comprising one or more color components and a coded representation of the video; wherein the coded representation conforms to a format rule that specifies that the coded representation includes a single syntax structure applicable to each layer of a multi-layer output layer set of the coded representation indicative of decoded picture buffer parameters.

In another example aspect, another video processing method is disclosed. The method includes performing a conversion between a video comprising one or more video layers comprising one or more color components and a coded representation of the video; wherein the coded representation conforms to a rule related to processing of the coded representation according to removal of pictures or subpictures from a buffer during a decoding process.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

BRIEF DESCRIPTION OF DRAWINGS

FIG. 7 is a flowchart for an example method of video processing.

DETAILED DESCRIPTION

Figure 2:
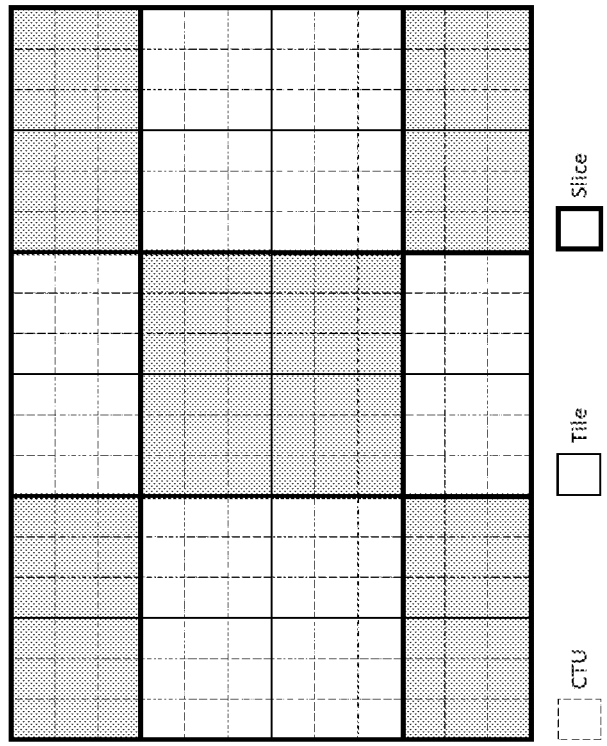
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also. In the present disclosure, editing changes are shown to text with double square brackets enclosing cancelled text, and highlight (e.g., boldface italics) indicating added text, with respect to the current draft of the versatile video coding (VVC) specification.

1. Introduction

This disclosure is related to video coding technologies. Specifically, it is about specifying and signalling level information for subpicture sequences. It may be applied to any video coding standard or non-standard video codec that supports single-layer video coding and multi-layer video coding, e.g., VVC that is being developed 2. Abbreviations APS Adaptation Parameter Set
AU Access Unit
AUD Access Unit Delimiter
AVC Advanced Video Coding
BLA Broken Link Access
BP Buffering Period
CLVS Coded Layer Video Sequence
CLVSS Coded Layer Video Sequence Start
CPB Coded Picture Buffer
CRA Clean Random Access
CTU Coding Tree Unit
CVS Coded Video Sequence
DCI Decoding Capability Information
DPB Decoded Picture Buffer
DUI Decoding Unit Information
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Points
JEM Joint Exploration Model
LTRP Long-Term Reference Picture
MCTS Motion-Constrained Tile Sets
NAL Network Abstraction Layer
OLS Output Layer Set
PH Picture Header
POC Picture Order Count
PPS Picture Parameter Set
PT Picture Timing
PTL Profile, Tier and Level
PU Picture Unit
RAP Random Access Point
RB SP Raw Byte Sequence Payload
SEI Supplemental Enhancement Information
SLI Subpicture Level Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Random Access and its Support in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra-coded pictures, but may also be inter-coded pictures (e.g., in the case of gradual decoding refresh).

HEVC includes signalling of intra random access points (TRAP) pictures in the NAL unit header, through NAL unit types. Three types of IRAP pictures are supported, namely instantaneous decoder refresh (IDR), clean random access (CRA), and broken link access (BLA) pictures. IDR pictures constrain the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or parts thereof at a CRA picture, e.g., during stream switching. To enable better systems usage of IRAP pictures, altogether six different NAL units are defined to signal the properties of the IRAP pictures, which can be used to better match the stream access point types as defined in the ISO base media file format (ISOBMFF), which are utilized for random access support in dynamic adaptive streaming over hypertext transfer protocol (HTTP) (DASH).

VVC supports three types of IRAP pictures, two types of MR pictures (one type with, or the other type without, associated RADL pictures), and one type of CRA picture. These are basically the same as in HEVC. The BLA picture types in HEVC are not included in VVC, mainly due to two reasons: i) the basic functionality of BLA pictures can be realized by CRA pictures plus the end of sequence NAL unit, the presence of which indicates that the subsequent picture starts a new CVS in a single-layer bitstream; and ii) there was a desire in specifying fewer NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signalling of GDR random access points and the recovery points. In VVC, a new NAL unit type is specified for indication of GDR pictures and the recovery point is signalled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed to intra coding entire pictures, thus allowing significant end-to-end delay reduction, which is considered more important nowadays than before as ultralow delay applications like wireless display, online gaming, drone based applications become more popular.

Another GDR-related feature in VVC is virtual boundary signalling. The boundary between the refreshed region (i.e., the correctly decoded region) and the unrefreshed region at a picture between a GDR picture and its recovery point can be signalled as a virtual boundary and, when signalled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.2. Picture Partitioning Schemes in HEVC

HEVC includes four different picture partitioning schemes, namely regular slices, dependent slices, tiles, and wavefront parallel processing (WPP), which may be applied for maximum transfer unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice-based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiplied by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence, tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2 .zip . With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.3. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
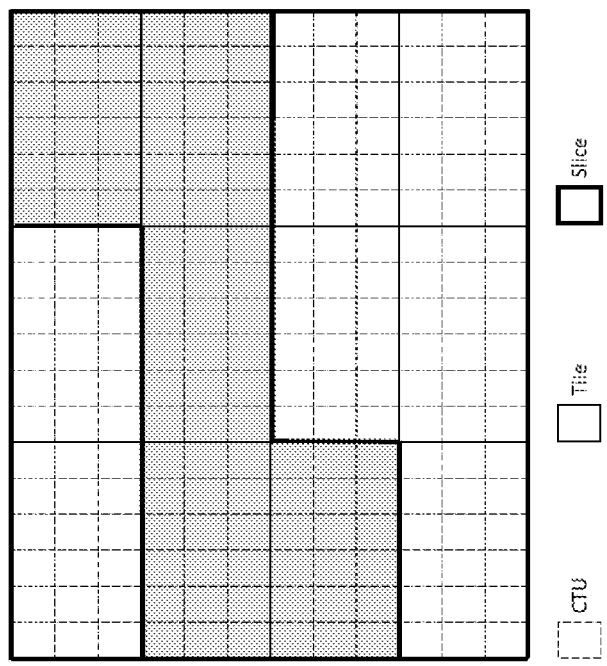
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
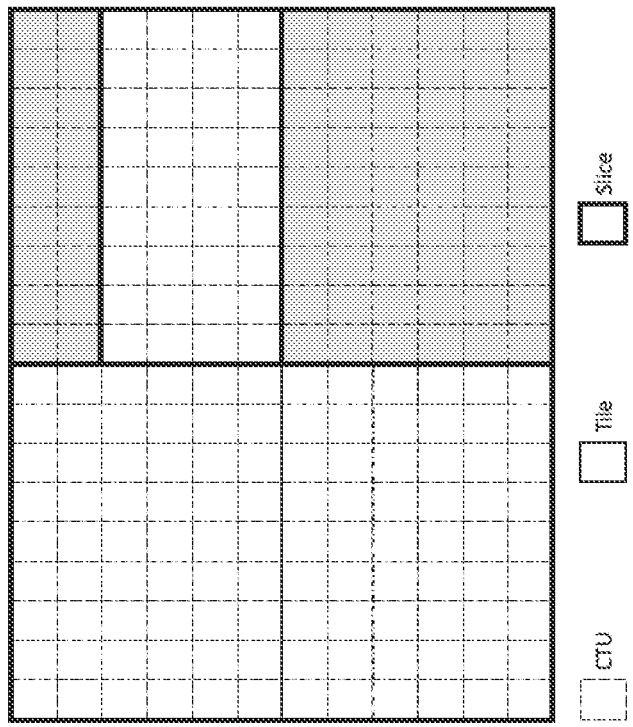
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
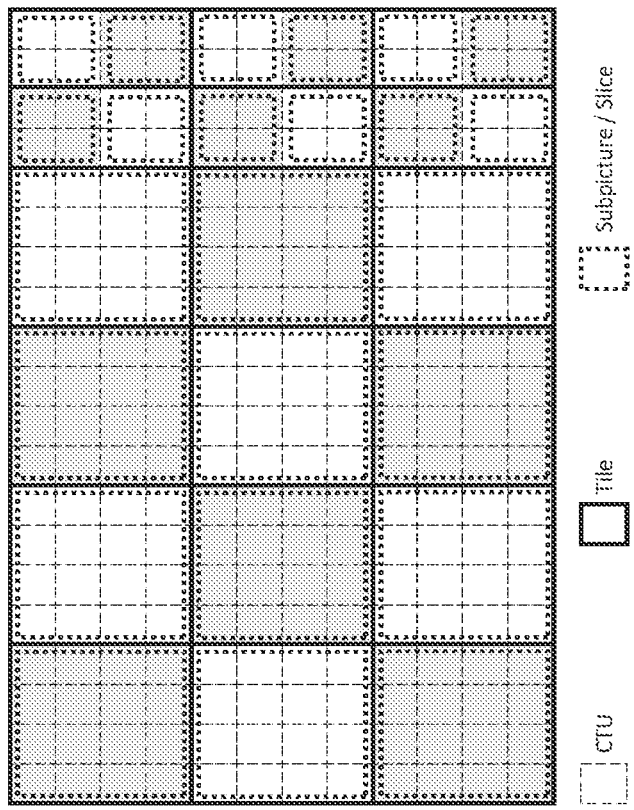
FIG. 4 shows a picture that is partitioned into 15 tiles, 24 slices, and 24 subpictures.

FIG. 4 shows an example of subpicture partitioning of a picture, where a picture is partitioned into 18 tiles: 12 on the left-hand side, each covering one slice of 4-by-4 CTUs; and 6 tiles on the right-hand side, each covering 2 vertically-stacked slices of 2-by-2 CTUs, altogether resulting in 24 slices and 24 subpictures of varying dimensions (each slice is a subpicture).

3.4. Picture Resolution Change Within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation (MC) interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) the picture resolution and the corresponding conformance window are signalled in the PPS instead of in the SPS, while in the SPS the maximum picture resolution is signalled; and ii) for a single-layer bitstream, each picture store (a slot in the DPB for storage of one decoded picture) occupies the buffer size as required for storing a decoded picture having the maximum picture resolution.

3.5. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an TRAP AU is required to contain a picture for each of the layers present in the CVS.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. Technical Problems Solved by Disclosed Technical Solutions

The latest designs of signalling of DPB parameters, removal of decoded pictures from the DPB, signalling of level information for subpicture sequences in SLI SEI messages, handling of SEI messages in subpicture extraction, and signalling a derivation of POC in VVC have the following problems (in the descriptions involving changes to some existing texts, additions are indicated in *bold italicized* text, and deletions are marked by open and close double square brackets (e.g., [[ ]]) with the deleted text being in between the double square brackets):

1) The DPB parameters syntax elements vps_ols_dpb_pic_width[i], vps_ols_dpbpic_height[i], vps_ols_dpb_chroma_format[i], and vps_ols_dpb_bitdepth_minus8[i] are signalled in the VPS for each multi-layer OLS. However, in many cases, multiple OLSs have the same values of these parameters, while the DPB parameters syntax elements max_dec_pic_buffering_minus1[i], max_num_reorder_pics[i], and max_latency_increase_plus1[i] are signalled in the dpb_parameters( ) syntax strucures, each of which can be shared by two or more OLSs.
2) WET-S0099 proposes the following change to the subpicture sub-bitstream extraction process: When outBitstream contains SEI NAL units that contain a scalable nesting SEI message with sn_nesting_ols_flag equal to 1 and sn_nesting_subpic_flag equal to 1 that are applicable to outBitstream, remove all SEI NAL units that contain a non-scalable-nested SEI message with payloadType equal to 1 (picture timing), 130 (decoding unit information) or 132 (decoded picture hash).
    However, this approach has the following issues:
    a. The condition for such removal to be applied should be when there were some subpictures removed by earlier steps instead of when outBitstream contains SEI NAL units that contain a scalable nesting SEI message with sn_nesting_ols_flag equal to 1 and sn_nesting_subpic_flag equal to 1 that are applicable to outBitstream.
    b. SEI NAL units containing some other non-scalable-nested SEI messages, including BP SEI messages, SLI SEI messages, that no longer apply to the output sub-bitstream should also be removed.
3) In the subpicture sub-bitstream extraction process, when no subpicture ID mapping is explicitly signalled in the input bitstream, while a subpicture sequence identified by subpicture index greater than 0 is extracted to be the output bitstream, the subpicture ID mapping (although there is only one subpicture in each picture in the output bitstream) needs to be included into the SPS.
4) WET-S0233 proposes to change the process for output and removal of pictures from the DPB specified in clause C.5.2.2 of the latest VVC draft specification as follows:

Otherwise (the current AU is not a CVSS AU, *the current AU is CVSS AU 0* , or the current AU is a CVSS AU that is not AU 0 but the current picture is not the first picture of the current AU), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
    The number of pictures in the DPB that are marked as "needed for output" is greater than max_num_reorder_pics[Htid].
    max_latency_increase_plus1[Htid] is not equal to 0 and there is at least one picture in the DPB that is marked as "needed for output" for which the associated variable PicLatencyCount is greater than or equal to MaxLatencyPictures[Htid].
    The number of pictures in the DPB is greater than or equal to max_dec_pic_buffering_minus1 [Htid]+1.
However, the change should be as follows instead:
    Otherwise (the current AU is not a CVSS AU, or the current AU is a CVSS AU [[that is not AU 0]] but the current picture is not the first picture of the current AU) . . .
5) WET-S0241 proposes to add the following constraints to resolve an asserted bug that may cause the POC derivation process to not work correctly for IRAP pictures in an independent non-output layer in which pictures other than IRAP pictures are not used for inter-layer prediction and hence would be removed during sub-bitstream extraction:
a. It is a requirement of bitstream conformance that the value of sps_poc_msb_cycle_flag shall be equal to 1 when both of the following conditions are true:
    The value of sps_video_parameter_set_id is not equal to 0.
    The SPS is referred to by at least a VCL NAL unit with layer id equal to nuh_layer_id and value of NumSubLayersInLayerInOLS[i][GeneralLayerIdx[nuh_layer_id]] is equal to 0 for any value of i in the range 0 TotalNumOlss−1, inclusive, and vps_independent_layer_flag[GeneralLayerIdx[nuh_layer_id]] is equal to 1.
b. It is a requirement of bitstream conformance that the value of ph_poc_msb_cycle_present_flag shall be equal to 1 when all the following conditions are true:
    The picture associated with the picture header is an TRAP picture or GDR picture with associated ph_recovery_poc_cnt equal to 0 that is not a CLVSS picture.
    The POC difference between the current picture and the previous TRAP picture or GDR picture with ph_recovery_poc_cnt equal to 0 in the same layer in decoding order is equal to or greater than MaxPicOrderCntLsb/2.
    The value of sps_video_parameter_set_id is greater than 0 and the value of NumSubLayersInLayerInOLS[i][GeneralLayerIdx[nuh_layer_id]] is equal to 0 for i in the range 0 TotalNumOlss−1, inclusive, and vps_independent_layer_flag[GeneralLayerIdx[nuh_layer_id]] is equal to 1.

However, the SPS constraints (in item a) do not seem needed, as the PH constraints would impose a necessary constraint on the value of sps_poc_msb_cycle_flag, while the proposed constraints are stricter than necessary. On the PH constraints (in item b): For the first item, "that is not a CLVSS picture" should not be there, because a CRA or GDR picture is usually not a CLVSS picture but may become CLVSS picture when a random access occurs starting from it. For the third item, "for i in the range 0 TotalNumOlss−1, inclusive" should be "for any value of i in the range 0 TotalNumOlss−1, inclusive", and finally "The value of sps_video_parameter_set_id is greater than 0" is not needed as the value of NumSubLayersInLayerInOLS[ ][ ][ ] is inferred when sps_video_parameter_set_id is equal to 0.

5. A Listing of Embodiments and Technical Solutions

To solve the above problems, and others, methods as summarized below are disclosed. The items should be considered as examples to explain the general concepts and should not be interpreted in a narrow way. Furthermore, these items can be applied individually or combined in any manner. In the descriptions involving changes to some existing texts, additions are indicated in *bold italicized* text, and deletions are marked by open and close double square brackets (e.g., [[ ]]) with the deleted text being in between the double square brackets.

1) To solve problem 1, instead of signalling a set of width, height, chroma format, and bit depth of a DPB picture storage buffer for each multi-layer OLS, signal these DPB parameters in the dpb_parameters( ) syntax strucures, each of which can be shared by two or more OLSs.
2) To solve problem 2, when there were some subpictures removed by the steps in the subpicture sub-bitstream extraction process, remove all SEI NAL units that contain a non-scalable-nested SEI message with payloadType equal to 0 (BP), 1 (PT), 130 (DUI), 132 (decoded picture hash), or 203 (SLI).
   a. Alternatively, when there were some subpictures removed by the steps in the subpicture sub-bitstream extraction process, remove all SEI NAL units that contain a non-scalable-nested SEI message with payloadType equal to 0 (BP), 130 (DUI), 132 (decoded picture hash), or 203 (SLI).
      i. Alternatively, furthermore, when general_same_pic_timing_in_all_ols_flag is equal to 0, remove all SEI NAL units that contain a non-scalable-nested SEI message with payloadType equal to 1 (PT).
3) To solve problem 3, in the subpicture sub-bitstream extraction process, when no subpicture ID mapping is explicitly signalled in the input bitstream, while a subpicture sequence identified by subpicture index greater than 0 is extracted to be the output bitstream, a step for rewriting of the referenced SPSs is added to include subpicture ID mapping into the SPS.
4) To solve problem 4, change the process for output and removal of pictures from the DPB specified in clause C.5.2.2 of the latest VVC draft specification as follows:

Otherwise (the current AU is not a CVSS AU, or the current AU is a CVSS AU [[that is not AU 0]] but the current picture is not the first picture of the current AU), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

The number of pictures in the DPB that are marked as "needed for output" is greater than max_num_reorder_pics[Htid].

max_latency_increase_plus1 [Htid] is not equal to 0 and there is at least one picture in the DPB that is marked as "needed for output" for which the associated variable PicLatencyCount is greater than or equal to MaxLatencyPictures[Htid].

The number of pictures in the DPB is greater than or equal to max_dec_pic_buffering_minus1 [Htid]+1.

5) To solve problem 5, add the following constraint to VVC:

It is a requirement of bitstream conformance that the value of ph_poc_msb_cycle_present_flag shall be equal to 1 when all the following conditions are true:

The picture associated with the picture header is an TRAP picture or GDR picture with associated ph_recovery_poc_cnt equal to 0 [[that is not a CLVSS picture]].

The POC difference between the current picture and the previous IRAP picture or GDR picture with ph_recovery_poc_cnt equal to 0 in the same layer in decoding order is equal to or greater than MaxPicOrderCntLsb/2.

The [[value of sps_video_parameter_set_id is greater than 0 and the]] value of NumSubLayersInLayerInOLS[i][GeneralLayerIdx[nuh_layer_id]] is equal to 0 for *any value of* i in the range 0 TotalNumOlss−1, inclusive, and vps_independent_layer_flag[GeneralLayerIdx[nuh_layer_id]] is equal to 1.

6. EMBODIMENTS

Below are some example embodiments for some of the invention aspects summarized above in Section 5, which can be applied to the VVC specification. The changed texts are based on the latest VVC text in JVET-S0152-v5. Most relevant parts that have been added or modified are indicated in *bold italicized* text, and some of the deleted parts are marked by open and close double square brackets (e.g., [[ ]]) with the deleted text being in between the double square brackets. There may be some other changes that are editorial in nature and thus not highlighted.

6.1. First Embodiment

This embodiment is for item 1.

7.3.2.2 Video Parameter Set RBSP Syntax

| | Descriptor |
|---|---|
| video_parameter_set_rbsp( ) { | |
|    ... | |
|    if( !vps_each_layer_is_an_ols_flag) { | |
|       vps_num_dpb_params_minus1 | ue(v) |
|       if( vps_max_sublayers_minus1 > 0 ) | |
|          vps_sublayer_dpb_params_present_flag | u(1) |
|       for( i = 0; i < VpsNumDpbParams; i++ ) { | |
|          if( !vps_default_ptl_dpb_hrd_max_tid_flag ) | |
|             vps_dpb_max_tid[ i ] | u(3) |
|          dpb_parameters(*1,* vps_dpb_max_tid[ i ], | |
|                 vps_sublayer_dpb_params_present_flag ) | |
|       } | |
|       for( i = 0; i < NumMultiLayerOlss; i++ ) [[{]] | |
|          [[vps_ols_dpb_pic_width[ i ]]] | [[ue(v)]] |
|          [[vps_ols_dpb_pic_height[ i ]]] | [[ue(v)]] |
|          [[vps_ols_dpb_chroma_format[ i ]]] | [[u(2)]] |
|          [[vps_ols_dpb_bitdepth_minus8[ i ]]] | [[ue(v)]] |
|          if( VpsNumDpbParams > 1 && VpsNumDpbParams != NumMultiLayerOlss ) | |
|             vps_ols_dpb_params_idx[ i ] | ue(v) |
| [[      }]] | |
|    ... | |
| } | |

7.3.2.3 Sequence Parameter Set RBSP Syntax

| | Descriptor |
|---|---|
| seq_parameter_set_rbsp( ) { | |
|    ... | |
|    if( sps_ptl_dpb_hrd_params_present_flag ) { | |
|       if( sps_max_sublayers_minus1 > 0 ) | |
|          sps_sublayer_dpb_params_flag | u(1) |
|       dpb_parameters( *0,*, sps_max_sublayers_minus1, sps_sublayer_dpb_params_flag) | |
|    } | |
|    ... | |
| } | |

7.3.4 DPB Parameters Syntax

| | Descriptor |
|---|---|
| dpb_parameters( *formatInfoFlag,* maxSubLayersMinus1, subLayerInfoFlag ) | |
| { | |
|    *if( formatInfoFlag ) {* | |
|       *dpb_ols_pic_width* | *ue(v)* |
|       *dpb_ols_pic_height* | *ue(v)* |
|       *dpb_ols_chroma_format* | *u(2)* |
|       *dpb_ols_bitdepth_minus8* | *ue(v)* |
|    *}* | |
|    for( i = ( subLayerInfoFlag ? 0 : maxSubLayersMinus1 ); | |
|          i <= maxSubLayersMinus1; i++ ) { | |
|       max_dec_pic_buffering_minus1[ i ] | ue(v) |
|       max_num_reorder_pics[ i ] | ue(v) |
|       max_latency_increase_plus1[ i ] | ue(v) |
|    } | |
| } | |

7.4.3.2 Video Parameter Set RBSP Semantics

. . .

[[vps_ols_dpb_pic_width[i] specifies the width, in units of luma samples, of each picture storage buffer for the i-th multi-layer OLS.]]

[[vps_ols_dpb_pic_height[i] specifies the height, in units of luma samples, of each picture storage buffer for the i-th multi-layer OLS.]]

[[vps_ols_dpb_chroma_format[i] specifies the greatest allowed value of sps_chroma_format_idc for all SPSs that are referred to by CLVSs in the CVS for the i-th multi-layer OLS.]]

[[vps_ols_dpb_bitdepth_minus8[i] specifies the greatest allowed value of sps_bitdepth_minus8 for all SPSs that are referred to by CLVSs in the CVS for the i-th multi-layer OLS.]]

[[NOTE 2—For decoding the i-th multi-layer OLS, the deoder can safely allocate memory for the DPB according to the values of the syntax elements vps_ols_dpb_pic_width[i], vps_ols_dpbpic_height[i], vps_ols_dpb_chroma_format[i], and vps_ols_dpb_bitdepth_minus8[i].]]

. . .

7.4.3.3 Sequence Parameter Set RBSP semantics

. . .

sps_chroma_format_idc specifies the chroma sampling relative to the luma sampling as specified in clause 6.2.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_chroma_format_idc shall be less than or equal to the value of *dpb_ols_chroma_ format in the vps_ols_dpb_params_ idx[ i ]-th dpb_parameters( ) syntax structure in the VPS* [[vps_ols_dpb_chroma_format[i]]].

. . .

sps_pic_width_max_in_luma_samples specifies the maximum width, in units of luma samples, of each decoded picture referring to the SPS. sps_pic_width_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_width_max_in_luma samples shall be less than or equal to the value of *dpb_ols_pic_width in the vps_ols_dpb_ params_idx[ i ]-th dpb_parameters( ) syntax structure in the VPS* [[vps_ols_dpb_pic_width[i]]].

sps_pic_height_max_in_luma_samples specifies the maximum height, in units of luma samples, of each decoded picture referring to the SPS. sps_pic_height_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_height_max_in_luma_samples shall be less than or equal to the value of *dpb_ols_pic_height in the vps_ols_dpb_ params_idx[ i ]-th dpb_parameters( ) syntax structure in the VPS* in the VPS[[vps_ols_dpb_pic_height[i]]].

. . .

sps_bitdepth_minus8 specifies the bit depth of the samples of the luma and chroma arrays, BitDepth, and the value of the luma and chroma quantization parameter range offset, QpBdOffset, as follows:

$$BitDepth=8+sps\_bitdepth\_minus8 \quad (47)$$

$$QpBdOffset=6*sps\_bitdepth\_minus8 \quad (48)$$

sps_bitdepth_minus8 shall be in the range of 0 to 8, inclusive.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_bitdepth_minus8 shall be less than or equal to the value of *dpb_ols_bitdepth_ minus8 in the vps_ols_dpb_ params_idx[ i ]-th dpb_parameters( ) syntax structure in the VPS* [[vps_ols_dpb_bitdepth_minus8[i]]].

. . .

7.4.5 DPB Parameters Semantics

. . .

When a dpb_parameters( )syntax structure is included in a VPS, the OLSs to which the dpb_parameters( )syntax structure applies are specified by the VPS. When a dpb_parameters( ) syntax structure is included in an SPS, it applies to the OLS that includes only the layer that is the lowest layer among the layers that refer to the SPS, and this lowest layer is an independent layer. *dpb_ols_pic_width specifies the width, , in units of luma samples, of each picture storage buffer for each of the OLSs to which the dpb_ parameters( ) syntax structure applies.*

*dpb_ols_pic_height specifies the height, in units of luma samples, of each picture storage buffer for each of the OLSs to which the dpb_ parameters( ) parameters( ) syntax structure applies*

*dpb_ols_chroma_ format specifies the greatest allowed value of sps_chroma _format_idc for all SPSs that are referred to by CLVSs in the CVS for each of the OLSsto which the dpb_parameters( )syntax structure applies .*

*dpb_ols_bitdepth_ minus8 specifies the greatest allowed value of sps_bitdepth_ minus8 for all SPSs that are referred to by CLVSs in the CVS for each of the OLSs to which the dpb_parameters( ) syntax structure applies*

*NOTE - For decoding each of the OLSs to which the dpb_ _parameters( ) syntax structure applies the deoder can safely allocate memory for the DPB according to the values of the syntax elements dpb_ols_pic_width dpb_ols_pic_height dpb_ols_chroma_ format and dpb_ols_bitdepth _minus8 .*

. . .

A.4.1 General Tier and Level Limits

. . .

For an OLS with OLS index TargetOlsIdx, the variables PicWidthMaxInSamplesY, PicHeightMaxInSamplesY, and PicSizeMaxInSamplesY, and the applicable dpb_parameters( )) syntax structure are derived as follows:

If NumLayersInOls[TargetOlsIdx] is equal to 1, PicWidthMaxInSamplesY is set equal to sps_pic_width_max_in_luma_samples, PicHeightMaxInSamplesY is set equal to sps_pic_height_max_in_luma_samples, and PicSizeMaxInSamplesY is set equal to PicWidthMaxInSamplesY*PicHeightMaxInSamplesY, where sps_pic_width_max_in_luma_samples and sps_pic_height_max_in_luma_samples are found in the SPS referred to by the layer in the OLS, and the applicable dpb_parameters( ) syntax structure is also found in that SPS.

Otherwise (NumLayersInOls[TargetOlsIdx] is greater than 1), PicWidthMaxInSamplesY is set equal to *dpb_ols_pic_width* [[vps_ols_dpb_pic_width[MultiLayerOlsIdx[TargetOlsIdx]]]], PicHeightMaxInSamplesY is set equal to *dpb_ols_pic_height* [[vps_ols_dpbpic_height[MultiLayerOlsIdx[TargetOlsIdx]]]], PicSizeMaxInSamplesY is set equal to PicWidthMaxInSamplesY * PicHeightMaxInSamplesY, and the applicable dpb_parameters( ) syntax structure is identified by vps_ols_dpb_params_idx[MultiLayerOlsIdx[TargetOlsIdx]] found in the VPS.

. . .

C.1 (HRD) General

. . .

For each bitstream conformance test, the CPB size (number of bits) is CpbSize[Htid][ScIdx] as specified in clause 7.4.6.3, where ScIdx and the HRD parameters are specified above in this clause, and the DPB parameters max_dec_pic_buffering_minus1 [Htid], max_num_reorder_pics [Htid], and MaxLatencyPictures[Htid] are found in or derived from the dpb_parameters( )) syntax structure that applies to the target OLS as follows:

If NumLayersInOls[TargetOlsIdx] is equal to 1, the dpb_parameters( )) syntax structure is found in the SPS referred to be the layer in the target OLS, and the variables PicWidthMaxInSamplesY, PicHeightMaxInSamplesY, MaxChromaFormat, and MaxBitDepthMinus8 are set equal to sps_pic_width_max_in_luma_samples, sps_pic_height_max_in_luma_samples, sps_chroma_format_idc, and sps_bitdepth_minus8, respectively, found in the SPS referred to by the layer in the target OLS.

Otherwise (NumLayersInOls[TargetOlsIdx] is greater than 1), the *applicable* dpb_parameters( )) *syntax structure* is identified by vps_ols_dpb_params_idx[MultiLayerOlsIdx[TargetOlsIdx]] found in the VPS, and the variables PicWidthMaxInSamplesY, PicHeightMaxInSamplesY, MaxChromaFormat, and MaxBitDepthMinus8 are set equal to *dpb_ols_pic_width,*, *dpb_ols_pic_height,*, *dpb_ols_chroma_format,*,*and dpb_ols_bitdepth_minus8,*, [[vps_ols_dpb_pic_width[MultiLayerOlsIdx[TargetOlsIdx]], vps_ols_dpbpic_height[MultiLayerOlsIdx[TargetOlsIdx]], vps_ols_dpb_chroma_format[MultiLayerOlsIdx[TargetOlsIdx]], and vps_ols_dpb_bitdepth_minus8[MultiLayerOlsIdx[TargetOlsIdx]],]] respectively, found in the *applicable dpb_ parameters( ) syntax structure* [[VPS]].

. . .

Figure 5:
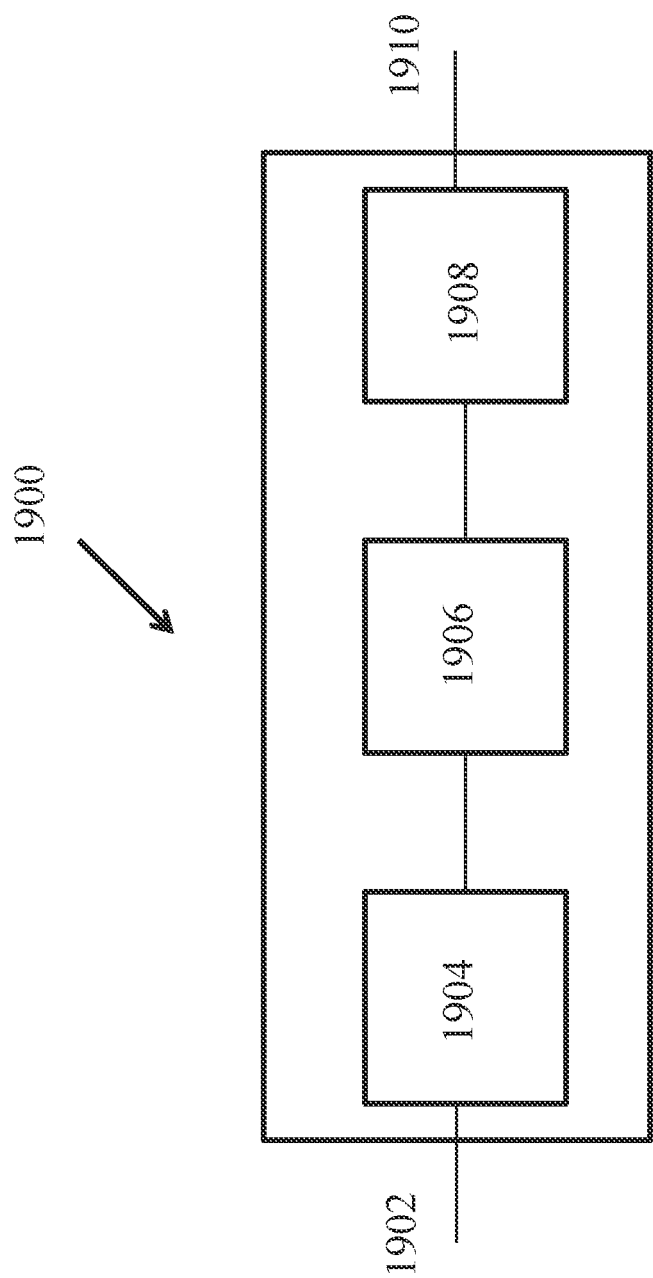
FIG. 5 is a block diagram of an example video processing system.

FIG. 5 is a block diagram showing an example video processing system 1900 in which various embodiments disclosed herein may be implemented. Various embodiments may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc., and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 6:
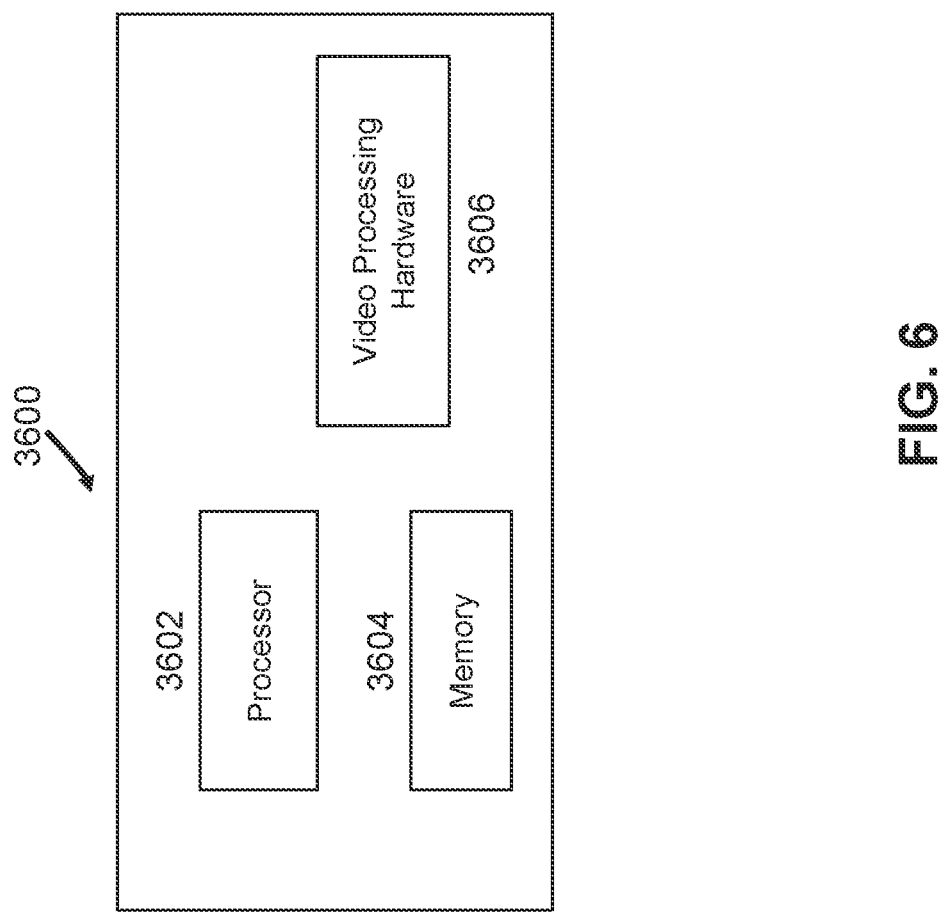
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 8:
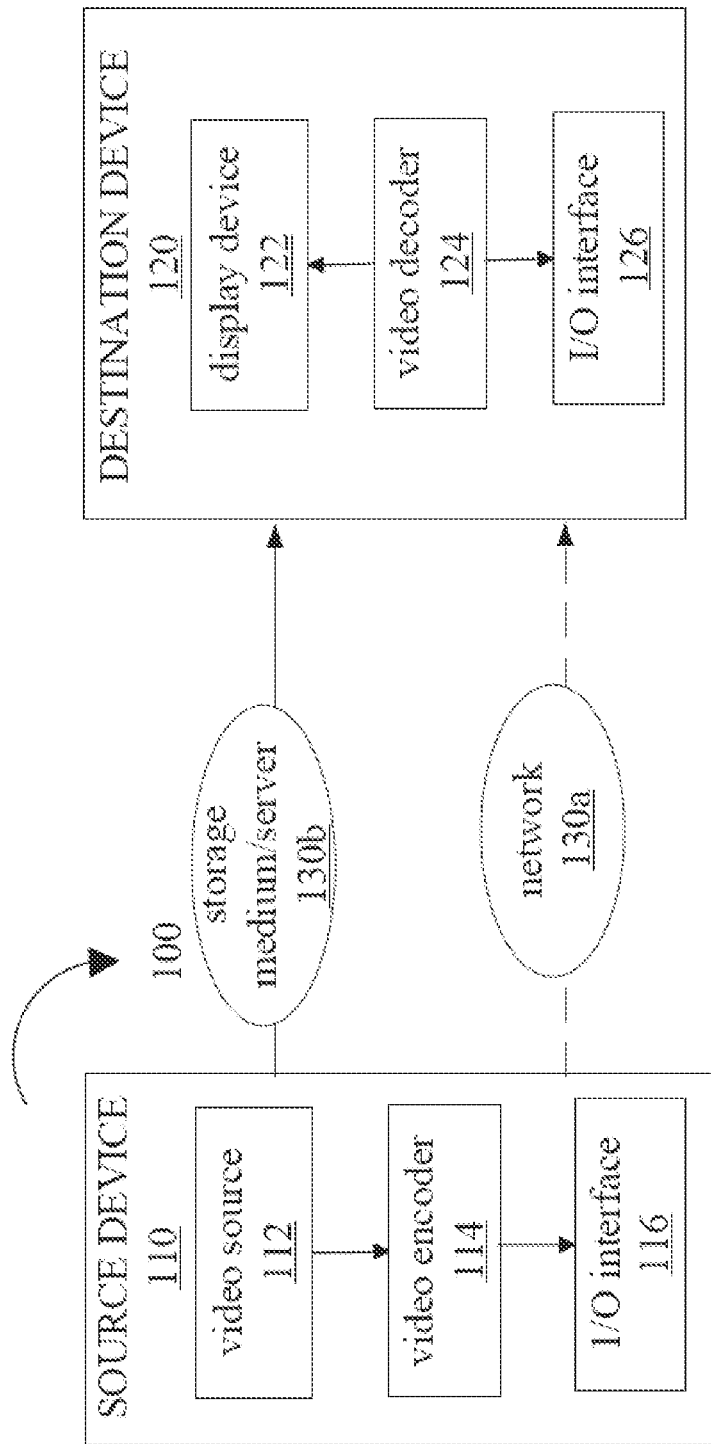
FIG. 8 is a block diagram that illustrates a video coding system in accordance with some embodiments of the present disclosure.

FIG. 8 is a block diagram that illustrates an example video coding system 100 that may utilize the embodiments of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/ server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the HEVC standard, VVC standard, and other current and/or further standards.

Figure 9:
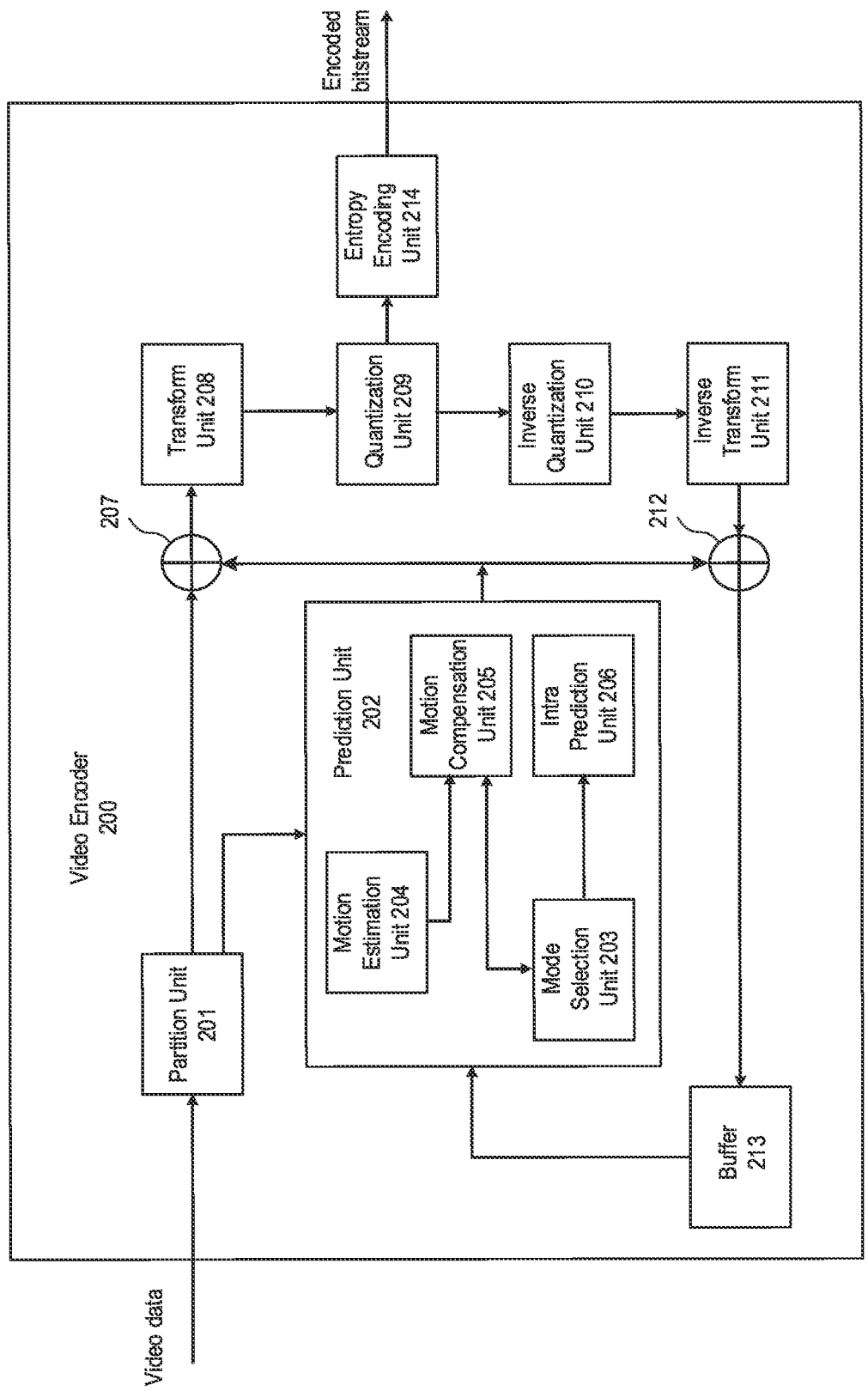
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the embodiments of this disclosure. In the example of FIG. 9, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
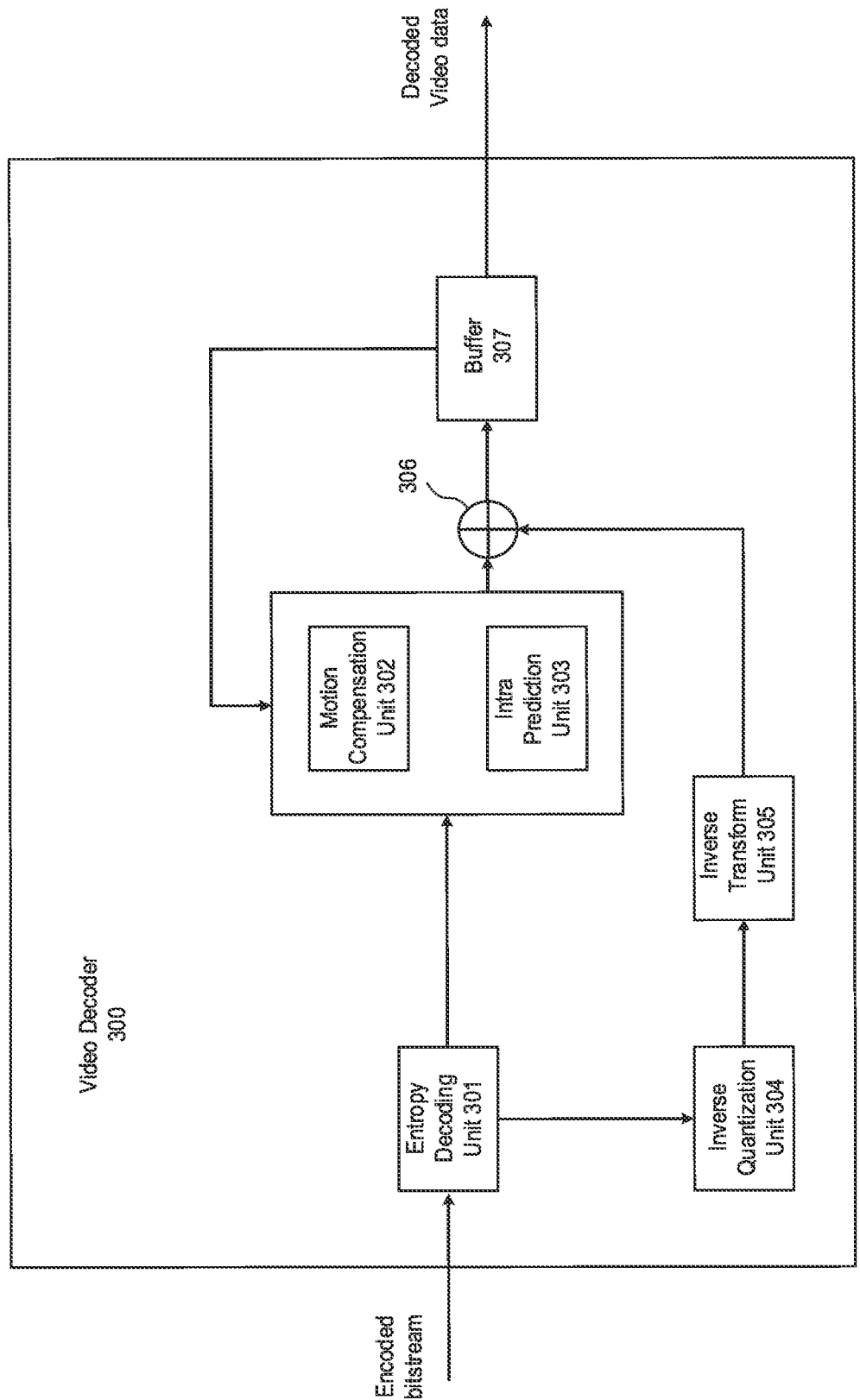
FIG. 10 is a block diagram that illustrates a decoder in accordance with some embodiments of the present disclosure.
Figure 11:
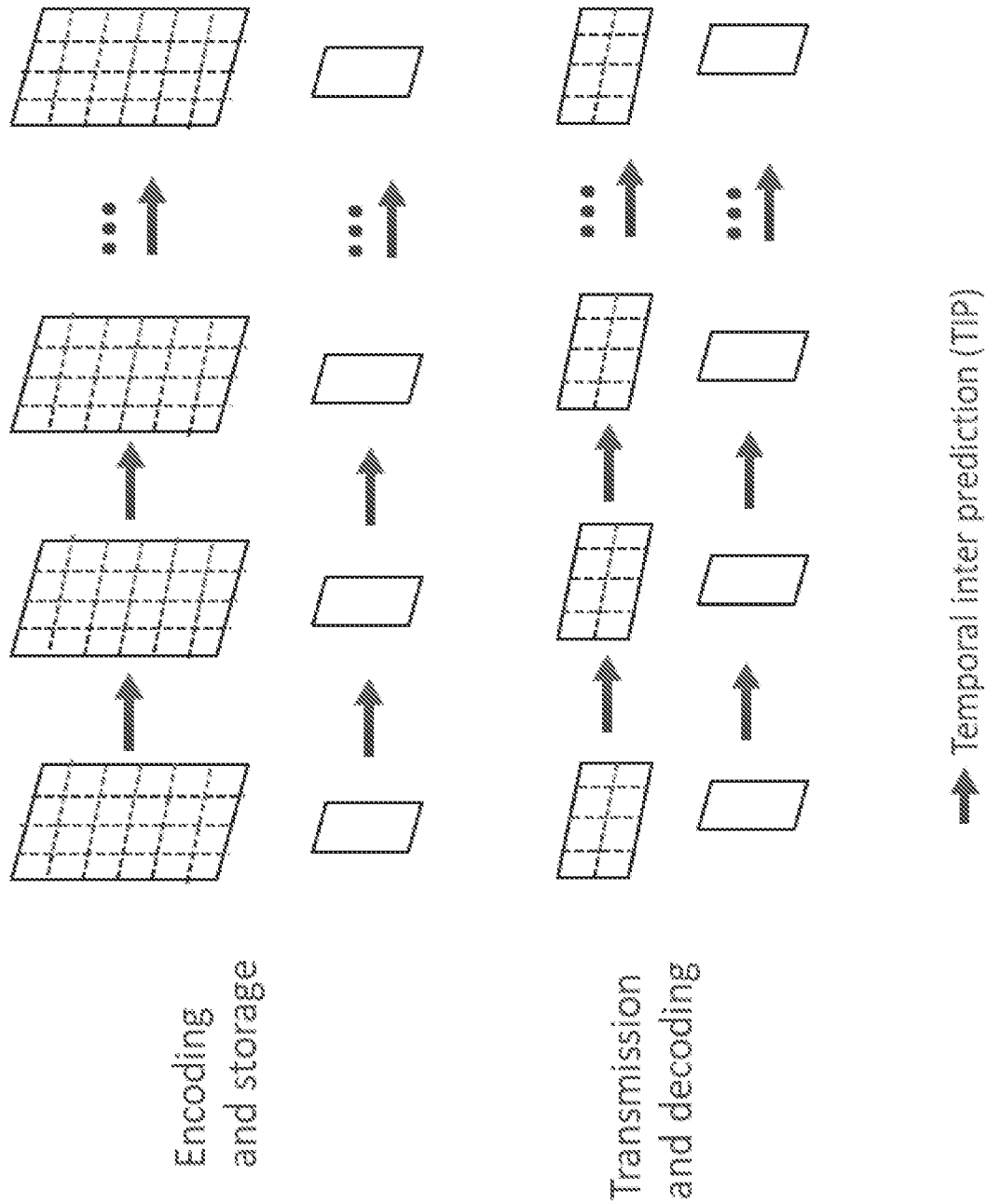
FIG. 11 shows an example of a typical subpicture-based viewport-dependent 360° video coding scheme.
Figure 12:
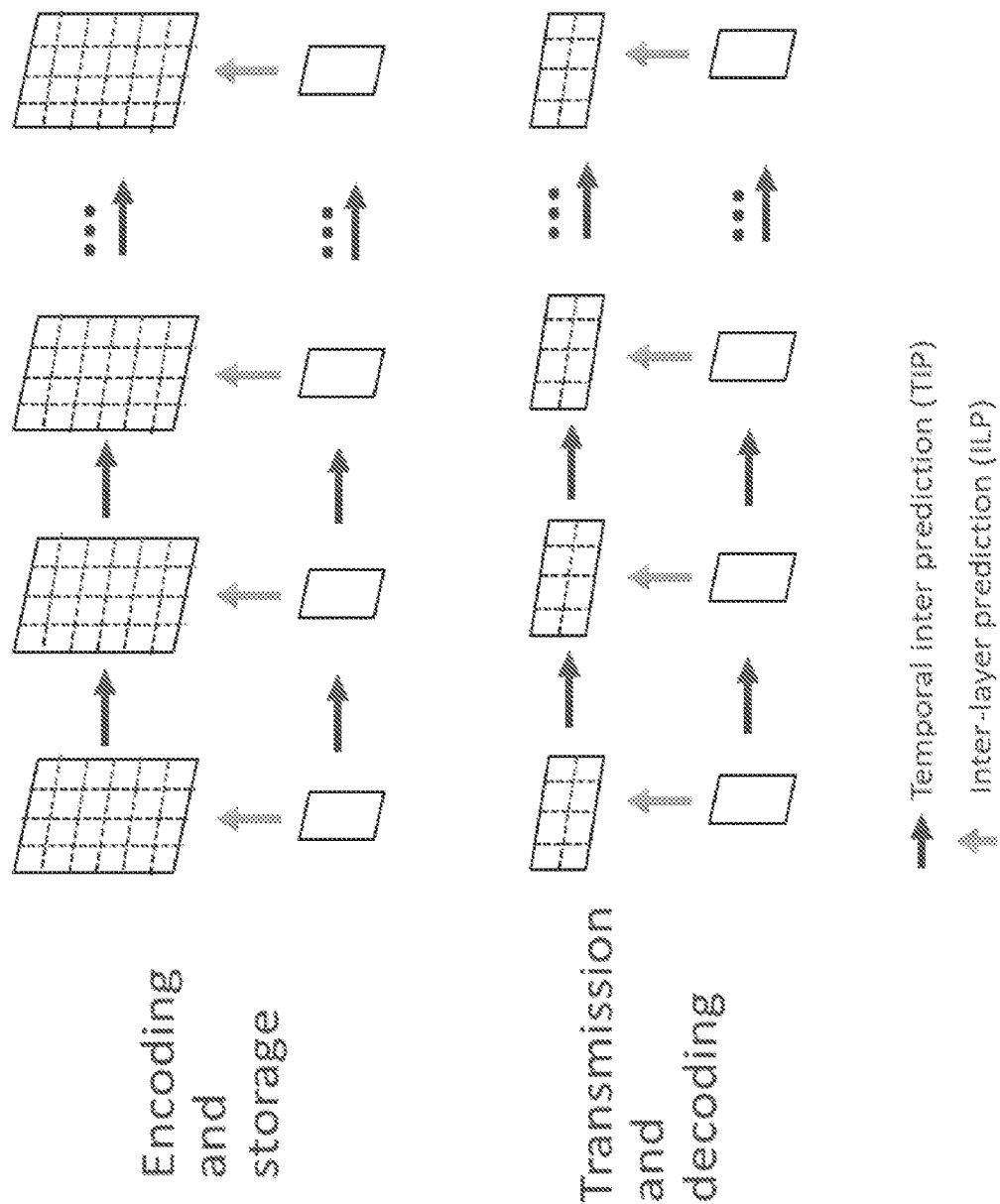
FIG. 12 shows a viewport-dependent 360° video coding scheme based on subpictures and spatial scalability.

FIG. 10 is a block diagram illustrating an example of video decoder 300 which may be video decoder 124 in the system 100 illustrated in FIG. 8.

The video decoder 300 may be configured to perform any or all of the embodiments of this disclosure. In the example of FIG. 10, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 10, video decoder 300 includes an entropy decoding unit 301, a motion compensation unit 302, an intra prediction unit 303, an inverse quantization unit 304, an inverse transform unit 305, a reconstruction unit 306, and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments discussed in the previous section (e.g., item 1).

1. A video processing method (e.g., method 700 shown in FIG. 7), comprising: performing (702) a conversion between a video comprising one or more video layers comprising one or more color components and a coded representation of the video; wherein the coded representation conforms to a format rule that specifies that the coded representation includes a single syntax structure applicable to each layer of a multi-layer output layer set of the coded representation indicative of decoded picture buffer parameters.

2. The method of solution 1, wherein the decoded picture buffer parameters include a width, a height, a chroma format, or a bit depth of the decoded picture buffer.

The following solutions show example embodiments discussed in the previous section (e.g., item 2, 3, 4).

3. A video processing method, comprising: performing a conversion between a video comprising one or more video layers comprising one or more color components and a coded representation of the video; wherein the coded representation conforms to a rule related to processing of the coded representation according to removal of pictures or subpictures from a buffer during a decoding process.

4. The method of solution 3, wherein the rule specifies that, in case that a subpicture is removed, then all supplemental enhancement information network abstraction layer (SEI NAL) units that contain a non-scalable-nested SEI message with payloadType equal to a prespecified type are removed.

5. The method of solution 4, wherein the prespecified type is 0 (BP), 1 (PT), 130 (DUI), 132 (decoded picture hash), or 203 (SLI).

6. The method of solution 4, wherein the prespecified type is 0 (BP), 130 (DUI), 132 (decoded picture hash), or 203 (SLI).

7. The method of solution 3, wherein the rule specifies that in case that a subpicture sequence identified by a subpicture index greater that zero is extracted as an output bitstream, then referenced sequence parameter sets (SPS) are rewritten to include subpicture id mapping to the SPS due to the coded representation not having a subpicture ID mapping.

8. The method of solution 3, wherein the rule specifies that pictures are removed from a decoded picture buffer in a manner similar to all access units.

9. The method of any of solutions 1 to 8, wherein the conversion comprises encoding the video into the coded representation.

10. The method of any of solutions 1 to 8, wherein the conversion comprises decoding the coded representation to generate pixel values of the video.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A method, apparatus or system described in the present disclosure.

Figure 13:
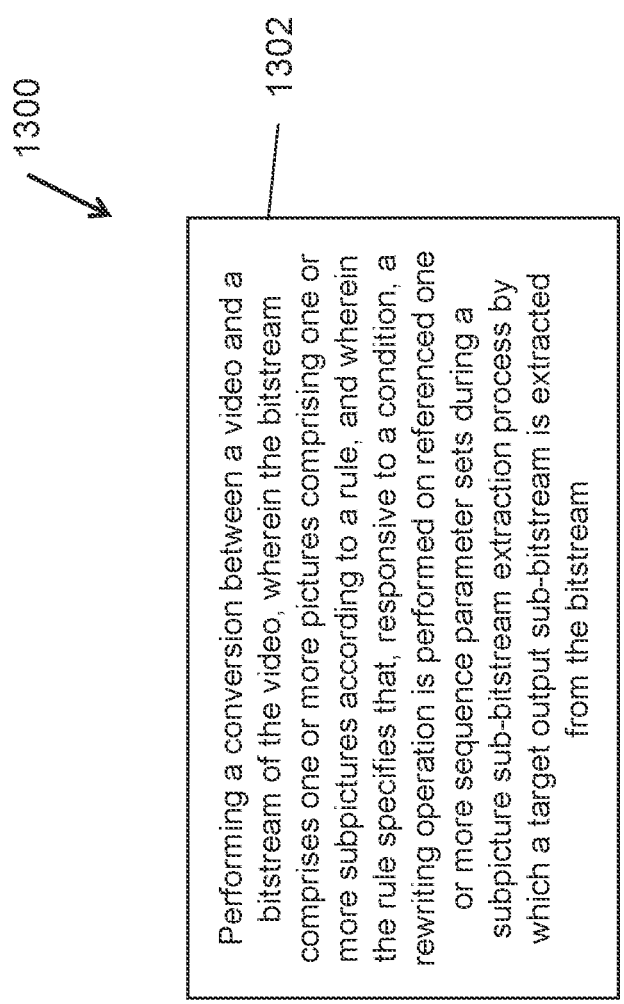
FIGS. 13 to 17 are flowcharts for example methods of video processing.

FIG. 13 is a flowchart for an example method 1300 of video processing. Operation 1302 includes performing a conversion between a video and a bitstream of the video, wherein the bitstream comprises one or more pictures comprising one or more subpictures according to a rule, and wherein the rule specifies that, responsive to a condition, a rewriting operation is performed on referenced one or more sequence parameter sets during a subpicture sub-bitstream extraction process by which a target output sub-bitstream is extracted from the bitstream.

In some embodiments of method 1300, the condition is that no subpicture identifier mapping is indicated in the bitstream and the subpicture sub-bitstream extraction process extracts a subpicture sequence that is identified by a subpicture index greater than zero. In some embodiments of method 1300, the rewriting operation comprises including a subpicture identifier mapping into the referenced one or more sequence parameter sets.

Figure 14:
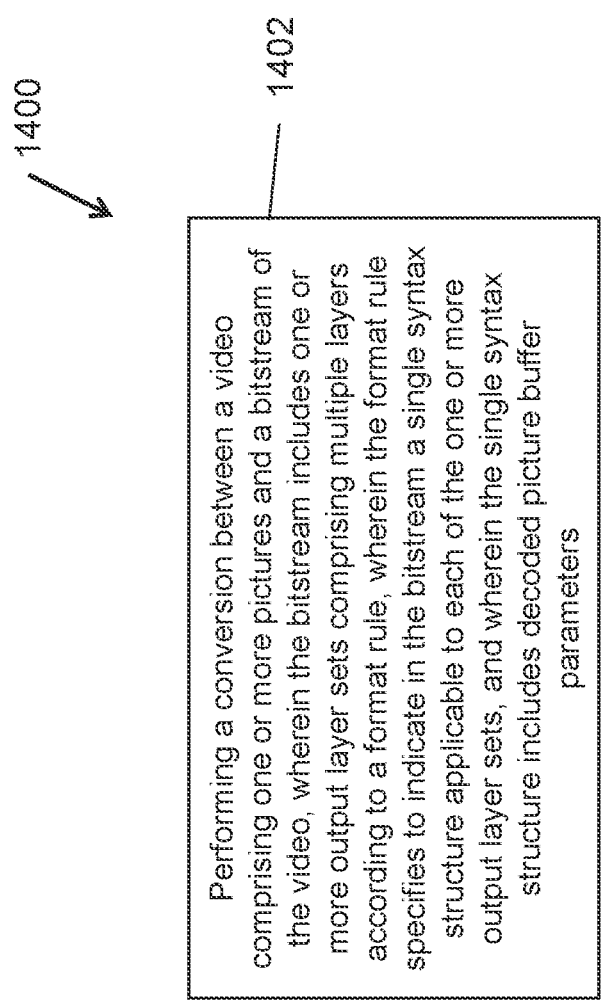

FIG. 14 is a flowchart for an example method 1400 of video processing. Operation 1402 includes performing a conversion between a video comprising one or more pictures and a bitstream of the video, wherein the bitstream includes one or more output layer sets comprising multiple layers according to a format rule, wherein the format rule specifies to indicate in the bitstream a single syntax structure applicable to each of the one or more output layer sets, and wherein the single syntax structure includes decoded picture buffer parameters.

In some embodiments of method 1400, the decoded picture buffer parameters include a width, a height, a chroma format, or a bit depth of a decoded picture buffer.

Figure 15:
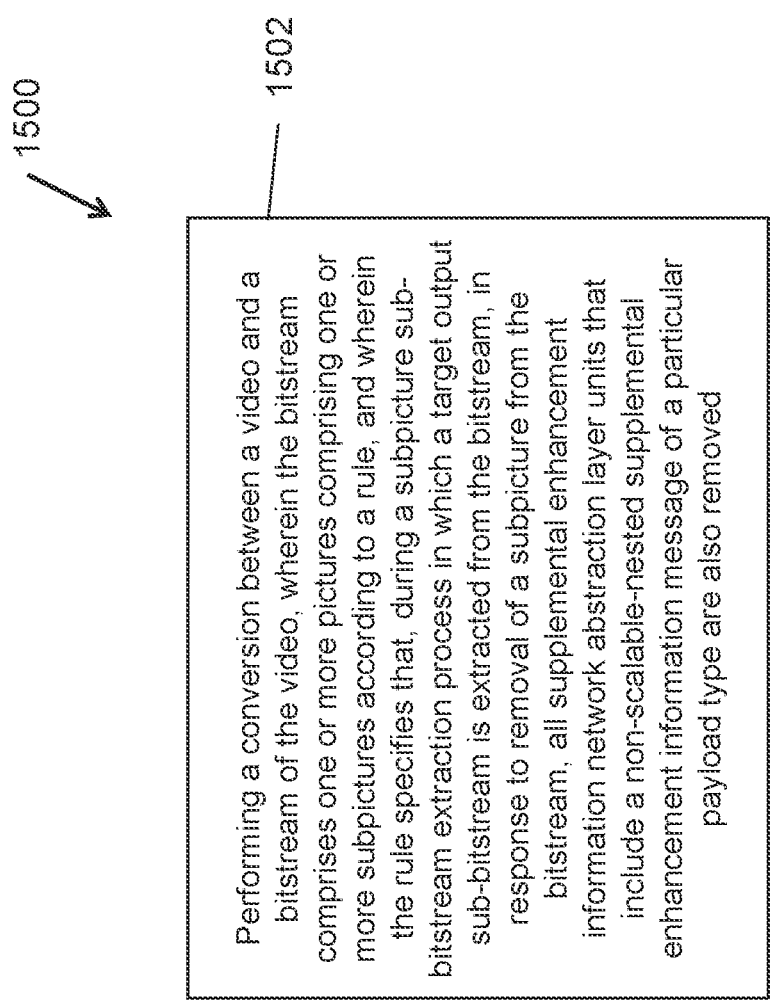

FIG. 15 is a flowchart for an example method 1500 of video processing. Operation 1502 includes performing a conversion between a video and a bitstream of the video, wherein the bitstream comprises one or more pictures comprising one or more subpictures according to a rule, and wherein the rule specifies that, during a subpicture sub-bitstream extraction process in which a target output sub-bitstream is extracted from the bitstream, in response to removal of a subpicture from the bitstream, all supplemental enhancement information network abstraction layer units that include a non-scalable-nested supplemental enhancement information message of a particular payload type are also removed.

In some embodiments of method 1500, a first value of the particular payload type is 0 indicating that the particular payload type is a buffering period, wherein a second value of the particular payload type is 1 indicating that the particular payload type is a picture timing, wherein a third value of the particular payload type is 130 indicating that the particular payload type is a decoding unit information, wherein a fourth value of the particular payload type is 132 indicating that the particular payload type is a decoded picture hash, or wherein a fifth value of the particular payload type is 230 indicating that the particular payload type is a subpicture level information. In some embodiments of method 1500, a first value of the particular payload type is 0 indicating that the particular payload type is a buffering period, wherein a second value of the particular payload type is 130 indicating that the particular payload type is a decoding unit information, wherein a third value of the particular payload type is 132 indicating that the particular payload type is a decoded picture hash, or wherein a fourth value of the particular payload type is 230 indicating that the particular payload type is a subpicture level information. In some embodiments of method 1500, the rule specifies that all supplemental enhancement information network abstraction layer units that include the non-scalable nested supplemental enhancement information message with the particular payload type with a value of 1 are removed from the bitstream in response to general_same_pic_timing_in_all_ols_flag being equal to 0, and wherein the value of 1 for the particular payload type indicates that the particular payload type is a picture timing.

Figure 16:
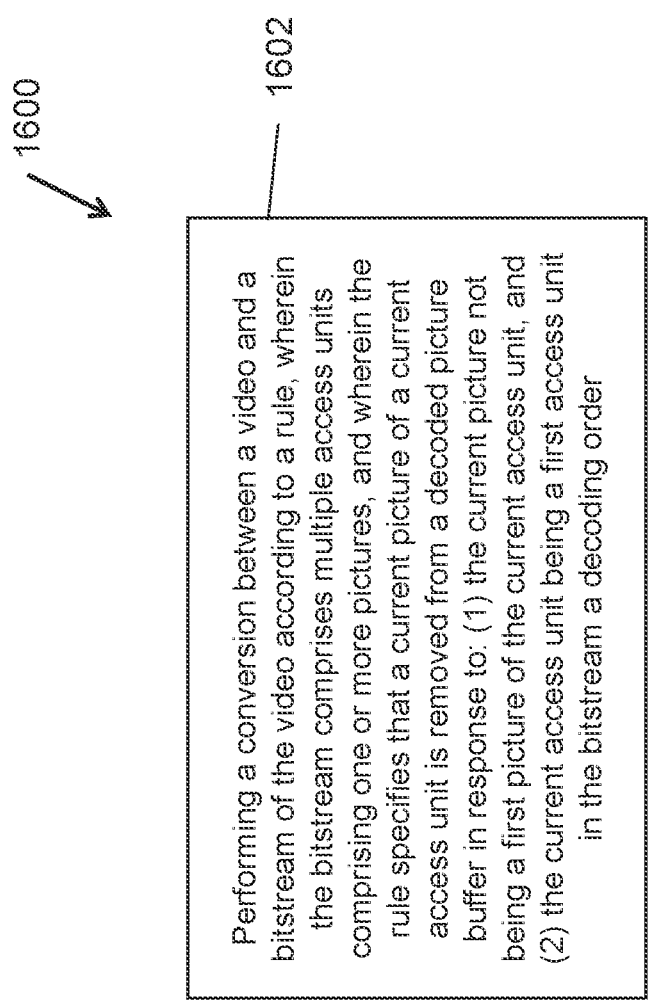

FIG. 16 is a flowchart for an example method 1600 of video processing. Operation 1602 includes performing a conversion between a video and a bitstream of the video according to a rule, wherein the bitstream comprises multiple access units comprising one or more pictures, and wherein the rule specifies that a current picture of a current access unit is removed from a decoded picture buffer in response to: (1) the current picture not being a first picture of the current access unit, and (2) the current access unit being a first access unit in the bitstream a decoding order.

In some embodiments of method 1600, a number of pictures in the decoded picture buffer that are marked as needed for output is greater than max_num_reorder_pics [Htid], wherein the_max_num_reorder_pics[ ] indicates a maximum allowed number of pictures of an output layer set that precedes any picture in the output layer set in the decoding order and follow that picture in an output order, and wherein Htid indicates a highest temporal sublayer to be decoded. In some embodiments of method 1600, wherein the decoded picture buffer includes at least one picture that is marked as needed for output for which an associated variable picture latency count is greater than or equal to MaxLatencyPictures[Htid], wherein MaxLatencyPictures[Htid] indicates a maximum number of pictures allowed to precede a particular picture in output order and follow the particular picture in decoding order, wherein Htid indicates a highest temporal sublayer to be decoded, and wherein max_latency_increase_plus1[Htid] is not equal to 0. In some embodiments of method 1600, a number of pictures in the decoded picture buffer is greater than or equal to max_dec_pic_buffering_minus1 [Htid]+1, and wherein max_dec_pic_buffering_minus1 [Htid]+1 specifies a maximum required size of the decoded picture buffer in units of picture storage buffers, and wherein Htid indicates a highest temporal sublayer to be decoded.

Figure 17:
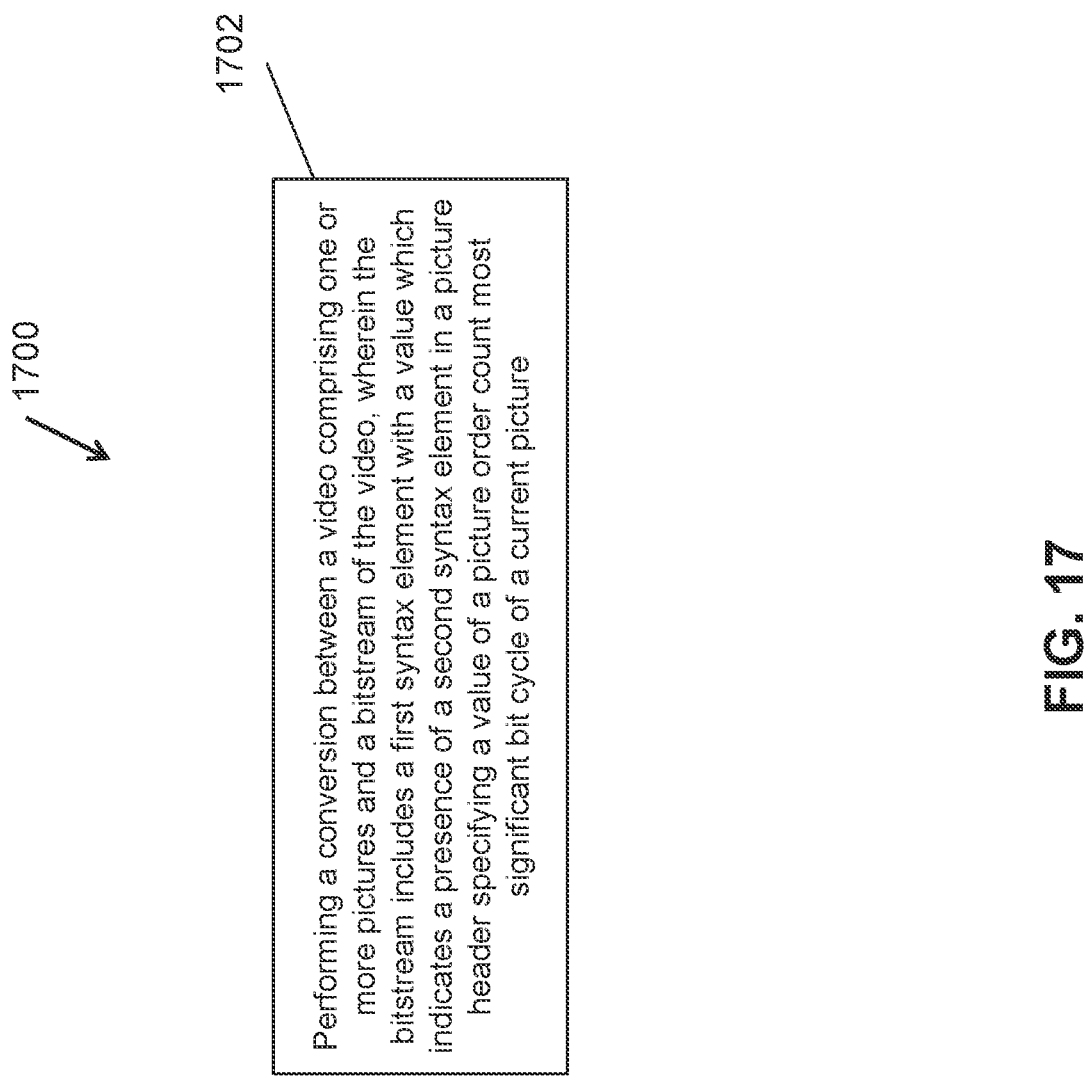

FIG. 17 is a flowchart for an example method 1700 of video processing. Operation 1702 includes performing a conversion between a video comprising one or more pictures and a bitstream of the video, wherein the bitstream includes a first syntax element with a value which indicates a presence of a second syntax element in a picture header specifying a value of a picture order count most significant bit cycle of a current picture, wherein the bitstream conforms to a format rule that species that the value of the first syntax element is equal to 1 in response to: (1) the current picture associated with the picture header is an intra random access point picture or a gradual decoding refresh picture with an associated third syntax element equal to 0 indicating that the current picture is a recovery point picture, (2) a picture order count difference between the current picture and a previous intra random access point picture or a previous gradual decoding refresh picture with the associated third syntax element equal to 0 in a same layer in a decoding order is equal to or greater than a variable that indicates a maximum picture order count least significant bit divided by 2, and (3) a value of NumSubLayersInLayerInOLS[i][GeneralLayerIdx[nuh_layer_id]] is equal to 0 for any value of i in a range 0 TotalNumOlss−1, inclusive, and vps_independent_layer_flag[GeneralLayerIdx[nuh_layer_id]] is equal to 1, wherein NumSubLayersInLayerInOLS[i][GeneralLayerIdx[nuh_layer_id]] indicates a number of sublayers in the GeneralLayerIdx[nuh_layer_id]-th output layer in an i-th output layer set, wherein TotalNumOlss specifies a total number of output layer sets specified by a video parameter set, wherein vps_independent_layer_flag[GeneralLayerIdx[nuh_layer_id]] equal to 1 specifies that a layer with a layer index equal to GeneralLayerIdx[nuh_layer_id] does not use inter-layer prediction, wherein GeneralLayerIdx[nuh_layer_id] specifies a layer index of a layer identifier equal to nuh_layer_id, and wherein nuh_layer_id specifies an identifier of a layer to which a video coding layer network abstraction layer unit belongs or the identifier of a layer to which a non-video coding layer network abstraction layer unit applies.

In some embodiments of method(s) 1300-1700, the performing the conversion comprising encoding the video into the bitstream. In some embodiments of method(s) 1300-1700, the performing the conversion comprises generating the bitstream from the video, and the method further comprises storing the bitstream in a non-transitory computer-readable recording medium. In some embodiments of method(s) 1300-1700, the performing the conversion comprises decoding the video from the bitstream.

In some embodiments, a video decoding apparatus comprising a processor configured to implement an operation related to embodiments for method(s) 1300-1700. In some embodiments, a video encoding apparatus comprising a processor configured to implement an operation related to embodiments for method(s) 1300-1700. In some embodiments, a computer program product having computer instructions stored thereon, the instructions, when executed by a processor, causes the processor to implement an operation related to embodiments for method(s) 1300-1700. In some embodiments, a non-transitory computer-readable storage medium that stores a bitstream generated according to an operation related to embodiments for method(s) 1300-1700. In some embodiments, a non-transitory computer-readable storage medium storing instructions that cause a processor to implement an operation related to embodiments for method(s) 1300-1700. In some embodiments, a method of bitstream generation, comprising: generating a bitstream of a video according to an operation related to embodiments for method(s) 1300-1700, and storing the bitstream on a computer-readable program medium. In some embodiments, a method, an apparatus, a bitstream generated according to a disclosed method or a system described in the present disclosure.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few embodiments and examples are described and other embodiments, enhancements and variations can be made based on what is described and illustrated in the present disclosure.

What is claimed is:

1. A method of processing video data, comprising:
performing a conversion between a video and a bitstream of the video,
wherein the bitstream comprises one or more pictures comprising one or more subpictures according to a rule,
wherein the rule specifies that, responsive to a condition that no subpicture identifier mapping is indicated in the bitstream and a subpicture sub-bitstream extraction process extracts a subpicture sequence that is identified by a subpicture index greater than zero, a rewriting operation is performed on referenced one or more sequence parameter sets during the subpicture sub-bitstream extraction process by which a target output sub-bitstream is extracted from the bitstream, and
wherein the rewriting operation comprises including a subpicture identifier mapping into the referenced one or more sequence parameter sets.

2. The method of claim 1, wherein the bitstream includes one or more output layer sets comprising multiple layers according to a format rule,
wherein the format rule specifies to indicate in the bitstream a single syntax structure applicable to each of the one or more output layer sets, and
wherein the single syntax structure includes decoded picture buffer parameters.

3. The method of claim 2, wherein the decoded picture buffer parameters include a width, a height, a chroma format, or a bit depth of a decoded picture buffer.

4. The method of claim 1, wherein the rule further specifies that, during a subpicture sub-bitstream extraction process in which the target output sub-bitstream is extracted from the bitstream, in response to removal of a subpicture from the bitstream, all supplemental enhancement information network abstraction layer units that include a non-scalable-nested supplemental enhancement information message of a particular payload type are also removed.

5. The method of claim 4, wherein a first value of the particular payload type being 0 indicates that the particular payload type is a buffering period,
wherein a second value of the particular payload type being 1 indicates that the particular payload type is a picture timing,
wherein a third value of the particular payload type being 130 indicates that the particular payload type is a decoding unit information,
wherein a fourth value of the particular payload type being 132 indicates that the particular payload type is a decoded picture hash, or
wherein a fifth value of the particular payload type being 230 indicates that the particular payload type is a subpicture level information.

6. The method of claim 4, wherein a first value of the particular payload type being 0 indicates that the particular payload type is a buffering period,
wherein a second value of the particular payload type being 130 indicates that the particular payload type is a decoding unit information,
wherein a third value of the particular payload type being 132 indicates that the particular payload type is a decoded picture hash, or
wherein a fourth value of the particular payload type being 230 indicates that the particular payload type is a subpicture level information.

7. The method of claim 4, wherein the rule specifies that all supplemental enhancement information network abstraction layer units that include the non-scalable-nested supplemental enhancement information message with the particular payload type with a value of 1 are removed from the bitstream in response to general_same_pic_timing_in_all_ols_flag being equal to 0, and
wherein the value of 1 for the particular payload type indicates that the particular payload type is a picture timing.

8. The method of claim 1, wherein performing the conversion comprises encoding the video into the bitstream.

9. The method of claim 1, wherein performing the conversion comprises decoding the video from the bitstream.

10. An apparatus for processing video data, comprising:
a processor; and
a non-transitory memory with instructions thereon, wherein the instructions upon execution by the processor, cause the processor to:
perform a conversion between a video and a bitstream of the video,
wherein the bitstream comprises one or more pictures comprising one or more subpictures according to a rule,
wherein the rule specifies that, responsive to a condition that no subpicture identifier mapping is indicated in the bitstream and a subpicture sub-bitstream extraction process extracts a subpicture sequence that is identified by a subpicture index greater than zero, a rewriting operation is performed on referenced one or more sequence parameter sets during the subpicture sub-bitstream extraction process by which a target output sub-bitstream is extracted from the bitstream, and
wherein the rewriting operation comprises including a subpicture identifier mapping into the referenced one or more sequence parameter sets.

11. A non-transitory computer-readable storage medium storing instructions that cause a processor to:
perform a conversion between a video and a bitstream of the video,
wherein the bitstream comprises one or more pictures comprising one or more subpictures according to a rule,
wherein the rule specifies that, responsive to a condition that no subpicture identifier mapping is indicated in the bitstream and a subpicture sub-bitstream extraction process extracts a subpicture sequence that is identified by a subpicture index greater than zero, a rewriting operation is performed on referenced one or more sequence parameter sets during the subpicture sub-bitstream extraction process by which a target output sub-bitstream is extracted from the bitstream, and
wherein the rewriting operation comprises including a subpicture identifier mapping into the referenced one or more sequence parameter sets.

12. A method for storing a bitstream of a video, comprising:
- generating the bitstream of the video; and
- storing the bitstream in a non-transitory computer-readable medium, wherein the bitstream comprises one or more pictures comprising one or more subpictures according to a rule,
- wherein the rule specifies that, responsive to a condition that no subpicture identifier mapping is indicated in the bitstream and a subpicture sub-bitstream extraction process extracts a subpicture sequence that is identified by a subpicture index greater than zero, a rewriting operation is performed on referenced one or more sequence parameter sets during the subpicture sub-bitstream extraction process by which a target output sub-bitstream is extracted from the bitstream, and
- wherein the rewriting operation comprises including a subpicture identifier mapping into the referenced one or more sequence parameter sets.

* * * * *